F. P. ENDICOTT.
FEED BOX.
APPLICATION FILED MAR. 16, 1910.
965,699.
Patented July 26, 1910.
2 SHEETS—SHEET 2.
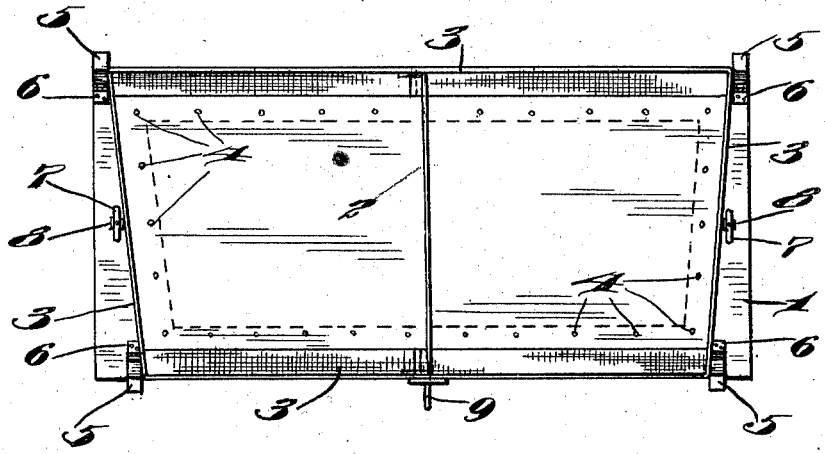
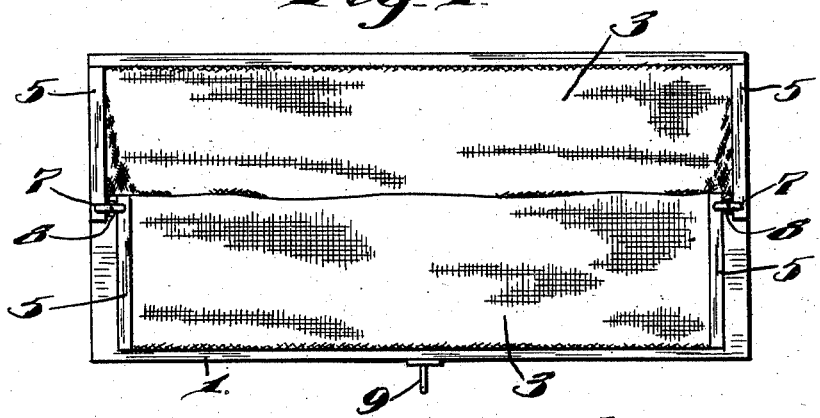
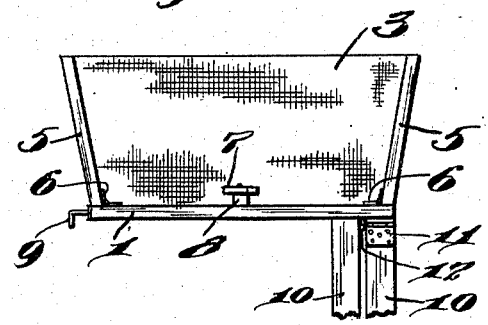

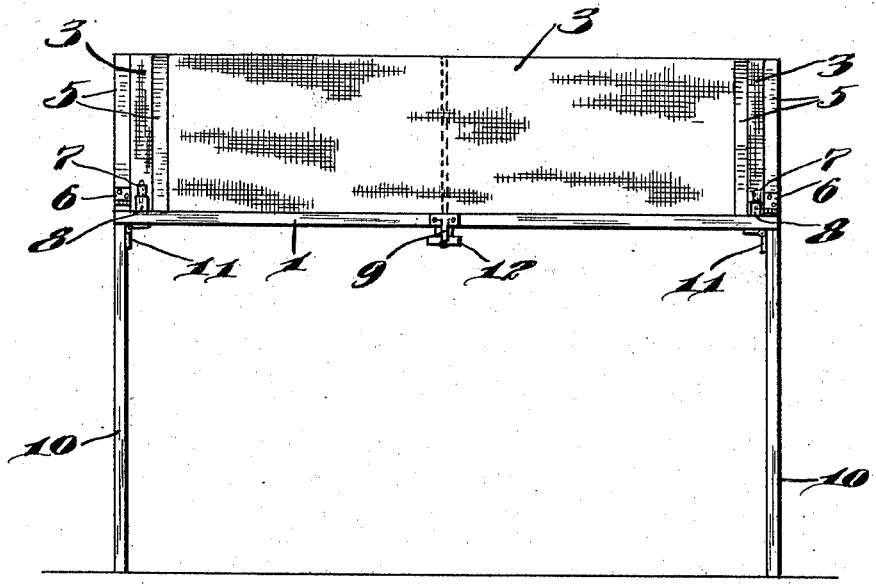
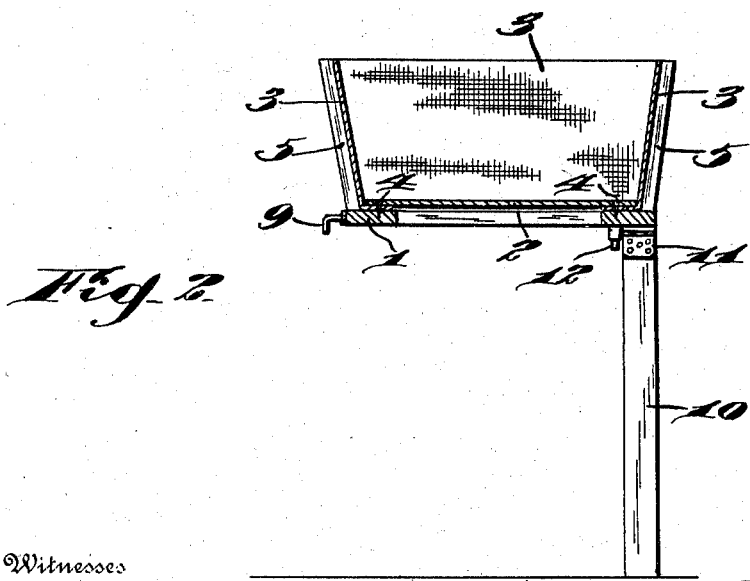

UNITED STATES PATENT OFFICE.

FRANKLIN P. ENDICOTT, OF MARLTON, NEW JERSEY.

FEED-BOX.

965,699.

Specification of Letters Patent. Patented July 26, 1910.

Application filed March 16, 1910. Serial No. 549,775.

*To all whom it may concern:*

Be it known that I, FRANKLIN P. ENDICOTT, a citizen of the United States, residing at Marlton, in the county of Burlington and State of New Jersey, have invented certain new and useful Improvements in Feed-Boxes, of which the following is a specification.

My invention relates to improvements in feed boxes, the object of the invention being to provide a feed box which is extremely light, which may be folded into small space when not desired for use, and which may be quickly shaped for use when needed.
A further object is to provide a feed box, composed largely of canvas or other flexible material, held in operative position by a folding frame, said folding frame having folding legs adapted to support the box in combination with a hook adapted to be caught in the clevis of a vehicle pole.

With these and other objects in view the invention consists in certain novel features of construction and combinations and arrangements of parts as will be more fully hereinafter described and pointed out in the claims.

In the accompanying drawings: Figure 1, is a view in side elevation illustrating my improvements. Fig. 2, is a view in cross section. Fig. 3, is a top plan view, showing the box open. Fig. 4, is a view similar to Fig. 3, showing the box folded, and Fig. 5, is a fragmentary end view.
1, represents a rectangular open frame, on which a metal plate 2, is secured, and between the metal plate 2, and frame 1, the edges of the canvas walls 3, are securely clamped and secured by means of the nails or other securing devices 4, which pass through plate 2, canvas 3, and into frame 1. This plate 2, and the walls 3, constitute the receptacle for feed, and it will be noted particularly by reference to Fig. 2, that the side walls slope or incline outwardly from their lower to their upper ends, which gives a general trough shape to the box, to enable the animal to pick up all the feed.

As above stated, the walls 3, are of canvas, and in top plan are of general rectangular form, with the corners or meeting points of said walls, secured to the edges of uprights 5. These uprights are connected to frame 1, by means of spring hinges 6, which tend to hold the uprights in working position, and it will be noted that the lower edges of these uprights 5, are slightly beveled to permit them to incline as shown, and give to the box its trough-like shape.

By reference particularly to Figs. 3, and 4, it will be noted that the uprights 5, at the ends of the frame, are not in alinement, so that when they are folded down side by side as shown in Fig. 4, the ends of the uprights will overlap, and turn buttons 7, are provided on lugs 8, which project between the uprights, when the latter are folded and the turn buttons serve to hold the uprights in folded position, flat against the frame.

9, represents a hook which is adapted to be caught in the clevis at the free end of a vehicle pole, and 10, 10, are legs which support the box. These legs are connected to frame 1, by spring hinges 11, which tend to hold them in vertical position, and these legs are secured in folded position by means of a turn button 12, it being understood as seen clearly in Fig. 5, that the legs are not in alinement, so that they may be folded side by side.

Various slight changes might be made in the general form and arrangement of parts described without departing from my invention and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a feed box, the combination with a frame, and a metal plate secured on the frame, of a canvas wall secured between the frame and plate, and hinged uprights secured to said wall at its corners, substantially as described.

2. In a feed box, the combination with a frame, a metal plate secured to the frame, a canvas wall secured between the plate and frame, and forming a four-sided receptacle, uprights hinged to the frame, and secured to the corners of said receptacle, said uprights at the respective ends of the frame out of alinement with each other, and adapted to be folded down against the frame, substantially as described.

3. In a feed box, the combination with a frame, a metal plate secured to the frame, a canvas wall secured between the plate and frame, and forming a four-sided receptacle, uprights hinged to the frame, and secured to the corners of said receptacle, said uprights at their respective ends of the frame out of alinement with each other, and adapted to be folded down against the frame, turn buttons located between the uprights when the latter are folded, and adapted to lock them in folded position, a hook at one edge of said frame, and legs hinged on said frame, substantially as described.

In testimony whereof I have signed my name to this specification in the presence of two subscribing witnesses.

FRANKLIN P. ENDICOTT.

Witnesses:
R. H. KRENKEL,
C. E. POTTS.